US012592993B2

(12) United States Patent
Lee

(10) Patent No.: US 12,592,993 B2
(45) Date of Patent: Mar. 31, 2026

(54) CAPTIONED TELEPHONE SERVICE SYSTEM FOR USER WITH SPEECH DISORDER

(71) Applicant: Mezmo Corporation, Buena Park, CA (US)

(72) Inventor: Haesung Lee, Irvine, CA (US)

(73) Assignee: Mezmo Corporation, Irvine, CA (US)

( * ) Notice: Subject to any disclaimer, the term of this patent is extended or adjusted under 35 U.S.C. 154(b) by 357 days.

(21) Appl. No.: 18/195,668

(22) Filed: May 10, 2023

(65) Prior Publication Data

US 2024/0380840 A1    Nov. 14, 2024

(51) Int. Cl.
| | |
|---|---|
| *G10L 13/00* | (2006.01) |
| *G10L 13/02* | (2013.01) |
| *G10L 15/04* | (2013.01) |
| *G10L 15/06* | (2013.01) |
| *G10L 15/07* | (2013.01) |
| *G10L 15/183* | (2013.01) |
| *G10L 15/22* | (2006.01) |
| *G10L 15/30* | (2013.01) |
| *H04M 3/42* | (2006.01) |

(52) U.S. Cl.
CPC ......... *H04M 3/42391* (2013.01); *G10L 13/02* (2013.01); *G10L 15/04* (2013.01); *G10L 15/063* (2013.01); *G10L 15/07* (2013.01); *G10L 15/183* (2013.01); *G10L 15/22* (2013.01); *G10L 15/30* (2013.01)

(58) Field of Classification Search
CPC ......... H04M 3/42391; H04M 2201/40; H04M 1/2475; H04M 1/72478; G06F 21/32; G10L 13/00; G10L 13/02; G10L 13/027; G10L 15/25; G10L 15/04; G10L 15/063; G10L 21/0364
See application file for complete search history.

(56) References Cited

U.S. PATENT DOCUMENTS

| | | | |
|---|---|---|---|
| 9,571,638 B1 * | 2/2017 | Knighton | ................ G10L 15/26 |
| 9,628,620 B1 * | 4/2017 | Rae | ....................... H04M 11/066 |
| 12,334,075 B2 * | 6/2025 | Sypniewski | ............ G10L 15/26 |
| 2010/0323728 A1 * | 12/2010 | Gould | ................. H04M 7/0048 |
| | | | 455/466 |
| 2013/0246061 A1 * | 9/2013 | Malkin | ................... G10L 21/00 |
| | | | 704/227 |

(Continued)

*Primary Examiner* — Jakieda R Jackson
(74) *Attorney, Agent, or Firm* — Heedong Chae; Lucem, PC

(57) ABSTRACT

A captioned telephone service (CTS) system provides a transcription service and a speech-to-text and text-to-speech converting service for the deaf or hard-of-hearing user with a speech disorder during a phone call between the user and the peer. The CTS system transcribes the peer's voice into text to be displayed on the user's device. The CTS system transcribes the user's voice into text based on the database storing user's spoken audios and corresponding texts, and converts the text into a clear and articulate speech to be sent to the peer's device instead of the user's voice in order to help the peer better understand what the user said. The CTS system includes a speech-to-text handler and a text-to-speech handler. The speech-to-text handler transcribes user's voice into text using the database, and the text-to-speech handler converts the text into a clear and articulate speech.

19 Claims, 5 Drawing Sheets

<u>500</u>

(56)  References Cited

U.S. PATENT DOCUMENTS

| 2017/0085506 A1* | 3/2017 | Gordon | H04L 51/066 |
|---|---|---|---|
| 2017/0140661 A1* | 5/2017 | Simmons | G09B 17/003 |
| 2018/0020285 A1* | 1/2018 | Zass | G10L 21/0224 |
| 2018/0063325 A1* | 3/2018 | Wilcox | H04M 3/42391 |
| 2018/0350395 A1* | 12/2018 | Simko | G10L 15/18 |
| 2019/0394330 A1* | 12/2019 | Engelke | H04M 3/42382 |
| 2020/0066294 A1* | 2/2020 | Zass | G10L 17/00 |
| 2021/0056960 A1* | 2/2021 | Howard | G10L 15/22 |
| 2021/0160580 A1* | 5/2021 | Janugani | G10L 21/18 |
| 2021/0289070 A1* | 9/2021 | Thomson | H04M 1/72475 |
| 2022/0129123 A1* | 4/2022 | Nair | G06F 8/38 |
| 2022/0262471 A1* | 8/2022 | Nakamura | A61B 6/03 |
| 2022/0277004 A1* | 9/2022 | Griffith | G06F 16/2471 |
| 2023/0393832 A1* | 12/2023 | Touati | H04L 67/10 |
| 2023/0402033 A1* | 12/2023 | Heinzmann | G10L 15/22 |
| 2024/0055014 A1* | 2/2024 | Zass | G10L 17/00 |
| 2024/0073219 A1* | 2/2024 | Maizels | G06V 10/145 |
| 2024/0095008 A1* | 3/2024 | Kanza | G06F 8/65 |

* cited by examiner

500

CAPTIONED TELEPHONE SERVICE SYSTEM FOR USER WITH SPEECH DISORDER

FIELD OF THE INVENTION

The present invention relates to a captioned telephone service ("CTS") system intended for a user who is deaf or hard-of-hearing ("DHH") and has a speech disorder. More particularly, the CTS system transcribes the voice of a user with a speech disorder into text, and then, converts the text into clear and articulate speech that is played to a peer. A CTS system provides a transcription service to a DHH user during a phone call between the user and peer by transcribing the peer's voice into text which is then sent to the user's device. However, if the user has a speech disorder, the peer may have difficulties in understanding the user's voice. The present invention addressed this problem by enabling the CTS system to transcribe the user's voice into text and then convert the text into clear, articulate speech that is played to the peer.

BACKGROUND OF THE INVENTION

A captioned telephone service, also known as CTS (herein after referred to as "CTS", "captioned telephone service", or "transcription service"), is used to assist individuals, particularly those who are deaf or hard of hearing ("DHH") but can speak, in making phone calls. A CTS system enables a DHH user (the CTS user) to have a phone call with another person (a peer) who may or may not be DHH by receiving the peer's voice, transcribing it into caption data, and sending the caption data to the CTS user's device for display as text.

The CTS user's device may be the user's own communications device such as a mobile wireless device, mobile phone, smart phone, landline phone, etc., or a terminal provided by a CTS provider. The user can make or receive calls using a user application installed on their device, and receive the transcription services from the CTS server.

However, some individuals who are DHH may also have a speech disorder or impairment. In cases where a hearing or speech impairment occurs before completing primary education (before language education is completed), the individual may struggle to form complete sentences or produce accurate pronunciation during conversations. Even if the hearing impairment occurs after primary education, the longer the individual experiences hearing or speech impairment, the more their pronunciation deviates from that of a person with normal hearing since they cannot hear and correct themselves. Although deaf and hard-of-hearing people have practiced to match socially accepted pronunciations, it requires considerable effort due to the difficulty of receiving feedback. Inaccurate pronunciation makes verbal communication with the person on the other end of a call difficult.

Therefore, to solve these problems, a CTS system which is configured to transcribe the voice of a user with a speech disorder into text and then, convert the text into clear, articulate speech to be played to a peer is provided in order to facilitate better understand of the user's voice, as there is a need for such a system that accomplishes this goal.

This invention is directed to solve these problems and satisfy the long-felt need.

SUMMARY OF THE INVENTION

The present invention contrives to solve the disadvantages of the prior art. The present invention provides a CTS system for a user who is DHH and also has a speech disorder, where the CTS system is configured to transcribe the voice of a user with a speech disorder into text and then, convert the text into a clear and articulate speech to be played to a peer.

The object of the present invention is to provide a CTS system for a DHH user with a speech disorder that offers a transcription service to transcribe the peer's voice for the user and a speech-to-text and text-to-speech converting service to help the peer better understand what the user said. The CTS system transcribes the peer's voice into text to be displayed on the user's device. Additionally, the CTS system transcribes the user's voice into text at least in part based on the database, and converts the text into a clear and articulate speech to be sent to the peer's device instead of the user's voice, in order to facilitate better understanding of what the user said.

The CTS system for a user with a speech disorder includes a CTS server, a user's device, a user application installed on the user's device, and a database. The CTS server provides a transcription service to the user during a phone call between the user and a peer, while the user's device is constructed to be connected to the CTS server for the phone call between the user's device and the peer's device. Furthermore, the database is associated with the user and stores user's spoken audios and corresponding texts.

The CTS system also includes a speech-to-text handler and a text-to-speech handler. The speech-to-text handler is configured to transcribe the user's voice into text based at least in part on the database, and the text-to-speech handler is configured to convert the text into a clear and articulate speech, which is then sent to the peer's device instead of the user's voice, helping the peer better understand what the user said.

Another object of the present invention is to provide a user's device to receive a transcription service and a speech-to-text and text-to-speech converting service for the user, who is DHH and has a speech disorder, during a phone call between the user and the peer by using the CTS system. The user's device includes a user application installed on the user's device. The user's device is constructed to be connected to the CTS server for the phone call between the user's device and the peer's device, and the CTS system includes a database, which is associated with the user and stores user's spoken audio and corresponding text. The CTS system further includes a speech-to-text handler and a text-to-speech handler, where the speech-to-text handler is configured to transcribe user's voice into text based at least in part on the database, and the text-to-speech handler is configured to convert the text into a clear and articulate speech which is then sent to the peer's device instead of the user's voice, helping the peer better understand what the user said.

Additionally, the user application is configured to provide a training text to the user to read, enabling the user's spoken audio to be saved alongside the corresponding training text in the database. The user application is further configured to display the text, transcribed from the user's voice by the speech-to-text handler, for confirmation or correction, and the user application further provides the user with suggestions for text correction.

Still another object of the present invention is to provide an audio preprocessor for providing a speech-to-text and text-to-speech converting service to a user with a speech disorder during a phone call between the user and a peer. The audio preprocessor includes a controller, a database, an audio input unit, a speech-to-text handler, a text-to-speech handler, and an audio output unit. The database is associated with the user and stores user's spoken audio and corresponding text. The audio preprocessor is constructed to be connected to the user's device and the peer's device for the phone call between the user's device and the peer's device, and the audio input unit receives a user's voice from the user's device. The speech-to-text handler is configured to transcribe the user's voice into text based at least in part on the database, and the text-to-speech handler is configured to convert the text into a clear and articulate speech to help the peer better understand the user's voice. Then, the audio output unit receives the speech and sends to the peer's device the speech instead of the user's voice to help the peer better understand what the user said. Furthermore, the audio preprocessor is configured to provide a training text to the user's device in order for the user to read it so that the user's spoken audio is saved together with the training text, which corresponds to the user's spoken audio, in the database.

The advantages of the present invention are: (1) the CTS system of the present invention provides not just a transcription service but also a speech-to-text and text-to-speech converting service for the DHH users with a speech disorder; (2) the CTS system of the present invention transcribes the peer's voice into text to be displayed on the user's device, and transcribes the user's voice into text based at least in part on the database, and then converts the text into a clear and articulate speech to be sent to the peer's device instead of the user's voice in order to help the peer better understand what the user said; (3) by converting hard-to-understand user's voice into clear, articulate speech, the present invention facilitates smoother conversations between the users and their peers; (4) the CTS system of the present invention provides a solution that accepts users' existing pronunciation and generates a corrected output speech, reducing the need for extensive pronunciation practice; (5) the CTS system of the present invention provides a user-friendly, convenient, and easy-to-use interface with options like "auto confirm", "manual confirm", "confirm", and "add" buttons; (6) as the user continues to use the CTS system, the database accumulates more data on their spoken audio and corresponding texts, improving transcription accuracy; (7) the CTS system of the present invention provides training texts for the user to read, enabling their spoken audio to be saved alongside corresponding training text in the database; (8) a user can correct the transcribed text from his voice, which, if corrected, is saved in the database along with the corresponding voice or saved to the list of training texts; (9) as the database accumulates more data, transcription accuracy improves, allowing users to rely more on the "auto confirm" button instead of the "manual confirm" button; (10) the present invention provides a training text generator to gather more data to be saved in the database in order to improve the accuracy of transcription of the user's voice; (11) the present invention utilizes a speech recognition system which incorporates the database of the user's spoken audios and corresponding texts in order to improve the accuracy of transcription of the user's voice; (12) the present invention employs a language model to analyze the transcription of the user's voice and provide suggestions for correction of the transcription; and (13) the CTS system of the present invention utilizes context information, such as current and previous conversations between the user and the peer, as well as conversations with other users or peers, to improve transcription accuracy.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment. Additionally, in all of the embodiments detailed below, call forwarding includes call routing.

Figure 1:
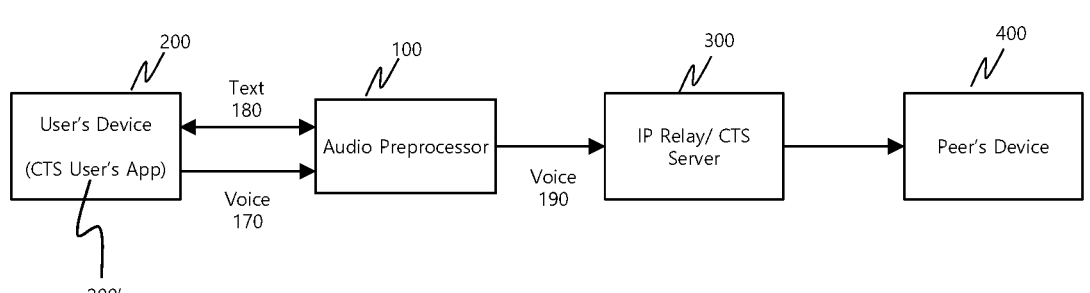
FIG. 1 shows a schematic diagram of the CTS system according to the present invention that provides an audio preprocessor.
Figure 2:
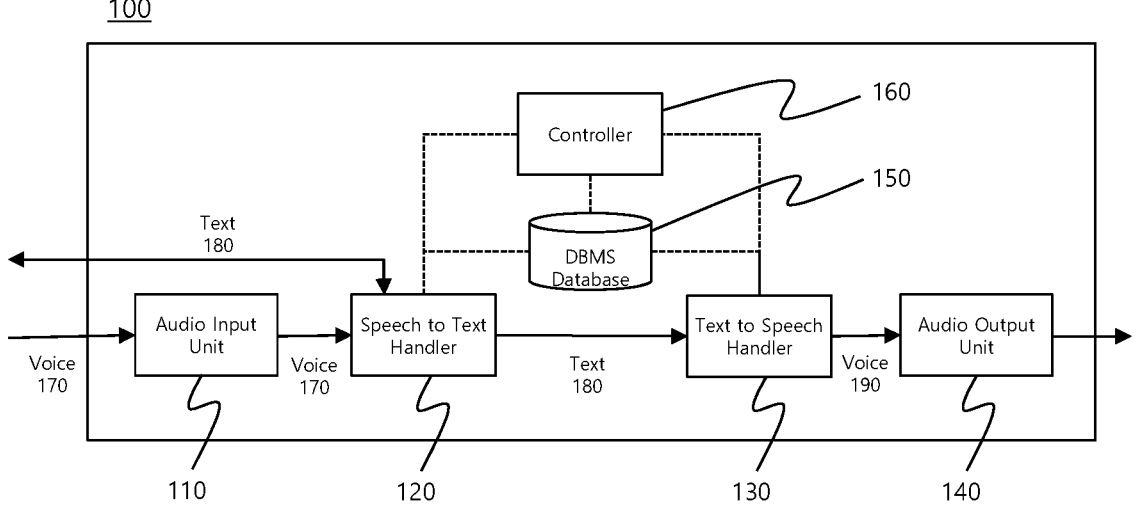
FIG. 2 shows a schematic diagram of the audio preprocessor according to the present invention.
Figure 3:
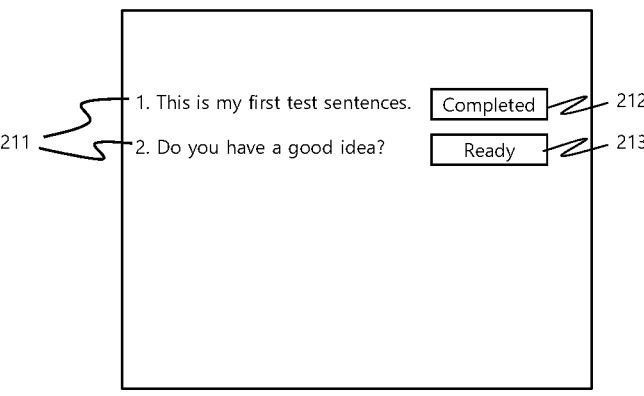
FIG. 3 shows a display of the user's device that shows training texts according to the present invention.
Figure 4:
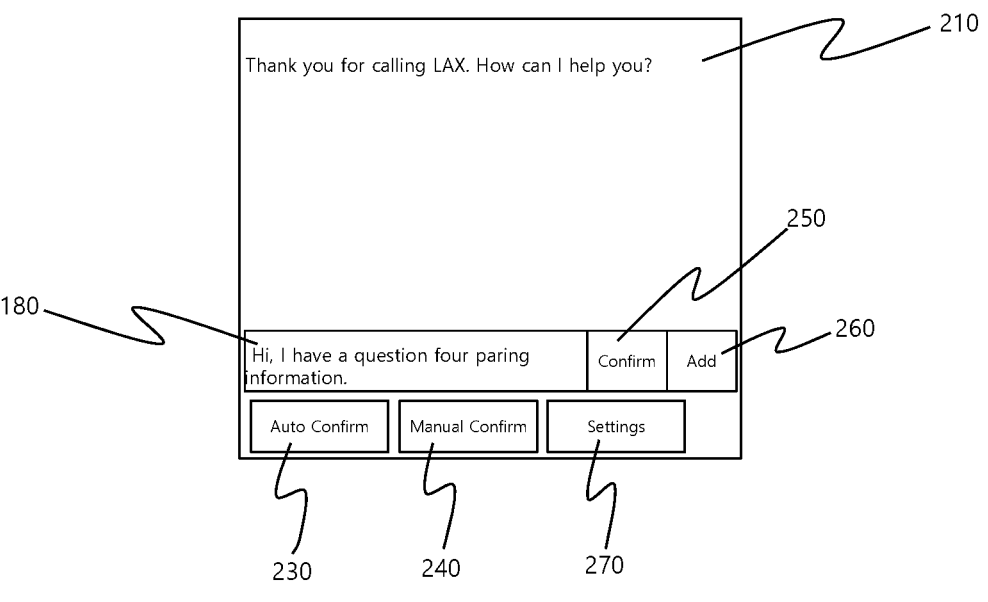
FIG. 4 shows the display of the user's device that shows the text transcribed from the peer's voice, the text transcribed from the user's voice by the speech-to-text-handler, and various buttons according to the present invention.
Figure 5:
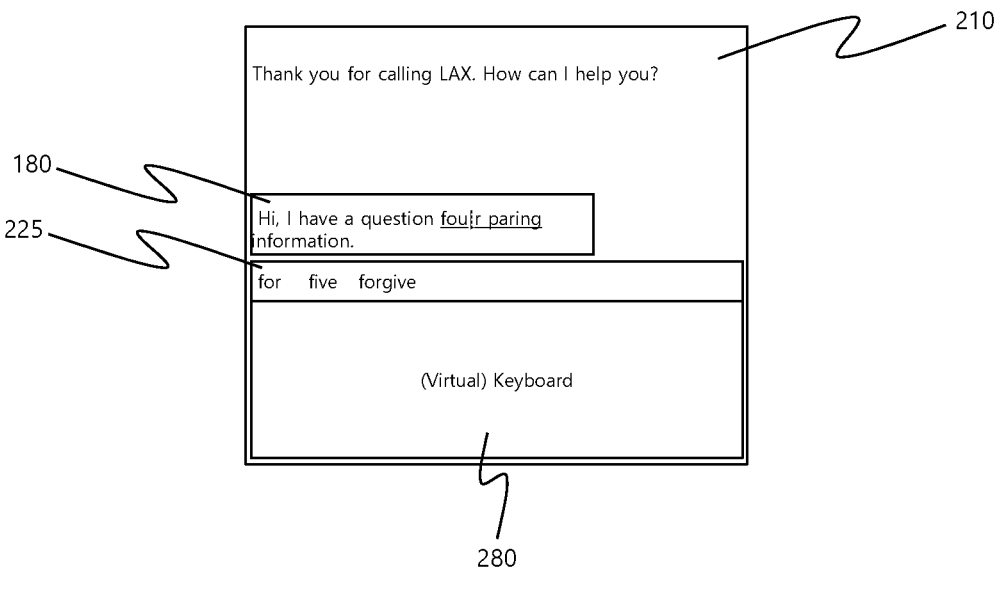
FIG. 5 shows the display of the user's device that shows the text transcribed from the peer's voice, the text transcribed from the user's voice by the speech-to-text-handler, suggestions for correction, and the virtual keyboard.

FIGS. 1 and 2 respectively show a schematic diagram of the CTS system 500 and a schematic diagram of the audio preprocessor 100 according to the present invention. The captioned telephone service ("CTS") system 500 provides a transcription service to the user during a phone call between the user 200 and the peer 400 where the CTS server 300 transcribes the peer's voice into a text to be displayed on the user's device as shown in FIGS. 4 and 5 (see 210). This transcription service is intended for a user who is DHH, and the user may additionally have a speech disorder.

According to the present invention, the CTS system 500 for a user with a speech disorder, includes a CTS server 300, a user's device 200, a user application 200' installed on the user's device 200, and a database 150. The CTS server 300 provides a transcription service to the user during a phone call between the user 200 and a peer 400, and the user's device 200 is constructed to be connected to the CTS server 300 for the phone call between the user's device 200 and a peer's device 400. In addition, the database 150 is associated with the user and stores user's spoken audio and corresponding text.

As shown in FIG. 2, the CTS system 500 further includes a speech-to-text handler 120 and a text-to-speech handler 130. The user with a speech disorder may have unclear pronunciation or non-standard pronunciation in his voice 170 to be sent to the peer's device 400. The speech-to-text handler 120 is configured to transcribe user's voice 170 into text 180 based at least in part on the database 150, and the text-to-speech handler 130 is configured to convert the text 180 into a clear and articulate speech 190 which is then sent to the peer's device 400 instead of the user's voice 170 to help the peer better understand what the user said.

As shown in FIGS. 1 and 2, the CTS system 500 further includes an audio preprocessor 100 and the audio preprocessor 200 includes the controller 160, the database 150, the audio input unit 110, the speech-to-text handler 120, the text-to-speech handler 130, and the audio output unit 140. The audio preprocessor 100 may be separate from the CTS server 300 or incorporated into the CTS server 300, and the present invention includes both embodiments even if FIG. 1 describes the audio preprocessor as separate from the CTS server 300. The audio input unit 110 receives the user's voice 170 from the user's device 200, and the audio output unit 140 receives the speech 190 and sends to the peer's device 400 the speech 190 instead of the user's voice 170 to help the peer better understand what the user said.

The user application 200' is configured to provide a training text 211 to the user to read so that the user's spoken audio is saved together with the training text, which corresponds to the user's spoken audio, in the database 150. The training text 211 may be a word, phrase, or sentence, and the database 150 may be a speech recognition database. The CTS system 500 includes mapping information between the user and the CTS server 300 based on a unique index assigned to the user where the audio preprocessor has a unique storage assigned to each unique index.

The audio preprocessor 100 analyzes the training text 211 and the user's spoken audio into individual phonemes using the speech-to-text functionality, updates the database 150 for the assigned unique index, and accumulates data of the user's spoken audio and corresponding training text 211. The database 150 may have default phonemes which may be replaced with the received phonemes.

The call path between the user's device and the peer's device may be connected from the user's device 200, to the audio preprocessor 100, to the CTS server 300, and to the peer's device 400, and the audio preprocessor 100 may be bypassed or manually or automatically set in the call path.

The CTS system 500 is configured to split the user's spoken audio into small audio segments and split the training text into corresponding small text segments, and then to save the small audio segments and the corresponding small text segments in the database 150. The small audio segments may be phonemes, phonetic spelling sequences, syllables, words, or the likes, and may further include the intonation information.

The text-to-speech handler 130 may include a setting to adjust voice characteristics or tone settings such as voice selection, pitch, rate, volume, emotional tone, pronunciation, etc.

The CTS system 500 further includes a training text generator (not shown) which generates the training text 211 by analyzing previous calls of the user and previous incorrect transcription of the user's voice 170.

The user application 200' may be configured to receive a training text 211 typed or inputted by the user in order for the user to read the training text 211 such that the user's spoken audio is saved together with the training text, which corresponds to the user's spoken audio, in the database 150. The training text 211 may be a word, phrase, or sentence.

As shown in FIG. 2, the speech-to-text handler 120 sends the text 180 to the user's device 200 for correction or confirmation by the user, and the CTS system 500 is configured to display the text 180, transcribed from the user's voice 170 by the speech-to-text handler 120, on the user's device 200 for confirmation or correction by the user. The CTS system 500 is configured to save the user's voice 170 together with the text 180, confirmed or corrected by the user, in the database 150. The confirmed or corrected text 180 is sent back to the speech-to-text handler 120. The CTS system 500 may be configured to split the user's voice 170 into small audio segments and split the text 180 into corresponding small text segments, and then to save the small audio segments and the corresponding small text segments in the database 150.

Alternatively, if the user is dissatisfied with the user's voice 170 and the transcribed text 180, the transcribed text 180 or corrected text 180 may be added to the list of training texts 211 to be read and recorded after the phone call has ended.

The speech-to-text handler 120 uses a speech recognition system, which has database of the speech recognition system, to transcribe the user's voice 170 into the text 180, and the speech-to-text handler 120 assigns greater weight to data of the database 150 of the CTS system than data of the database of the speech recognition system in transcribing the user's voice 170 into the text 180. The speech recognition system uses a language model to analyze the text 180, transcribed from the user's voice 170 by the speech-to-text handler 120, in order to provide suggestions of a word, phrase, or sentence for correction such that the suggestions 225 are displayed on the user's device 200 for review by the user.

The speech recognition system may use a language model to generate the text 180, wherein the language model analyzes previously transcribed conversation between the user and the peer in the phone call between the user and the peer. The database of the speech recognition system may include context information based on previous conversation between the user and the peer, a phone number of the peer, previous conversation between the user and other peers, previous conversation between the peer and other users, etc. This context information may include phone calls with peers such as utility service providers (internet, electricity, gas, etc.), restaurants placing orders, financial service providers, or characteristics of a call such as an emergency call.

In the alternative embodiment, the user's device 200 is configured to receive a transcription service and a speech-to-text and text-to-speech converting service to a user with a speech disorder during a phone call between the user and a peer by using a captioned telephone service ("CTS") system 500. The user's device 200 includes a user application 200' installed on the user's device 200. The user's device 200 is constructed to be connected to a CTS server 300 for the phone call between the user's device 200 and a peer's device 400, and the CTS system 500 includes a database 150, which is associated with the user and stores user's spoken audio and corresponding text. The CTS system 500 further includes a speech-to-text handler 120 and a text-to-speech handler 130, where the speech-to-text handler 120 is configured to transcribe user's voice 170 into text 180 based at least in part on the database 150, and the text-to-speech handler 130 is configured to convert the text 180 into a clear and articulate speech 190 which is then sent to the peer's device 400 instead of the user's voice 170 to help the peer better understand what the user said.

In addition, the user application 200' is configured to provide a training text 211 to the user to read so that the user's spoken audio is saved together with the training text 211, which corresponds to the user's spoken audio, in the database 150. The user application 200' is further configured to display the text 180 transcribed from the user's voice 170 by the speech-to-text handler 120 as shown in FIGS. 4 and 5.

The user application 200' provides an "auto confirm" button 230 and a "manual confirm" button 240 where the two buttons 230, 240 are placed next to each other. If the "manual confirm" button 240 is activated by the user, the user application 200' allows the text 180, transcribed from the user's voice by the speech-to-text handler 120, to be confirmed or corrected by the user, and if the "auto confirm" button 230 is activated by the user, the user application 200' does not allow the text 180, transcribed from the user's voice 170 by the speech-to-text handler 120, to be corrected by the user.

The user application 200' further provides an "add" button 260, where if the "manual confirm" button 240 is activated by the user and the user presses the "add" button 260, the text 180, transcribed from the user's voice 170 by the speech-to-text handler 120, and the corresponding user's voice 170 are saved in the database 150 or provided to a list of training text 211. If the "manual confirm" button 240 is activated by the user, the user application 200' provides to the user a suggestion 225 for correction for the text 180, transcribed from the user's voice 170 by the speech-to-text handler 120. As shown in FIG. 5 as an example, the user application 200' provides a suggestion 225 to correct "four" to "for", "five", or "forgive". Alternatively, the speech recognition system or the language model of the speech recognition system may provide a suggestion 225 of "for parking" for the transcribed "four paring". If "four paring" is corrected to "for parking" by the user, the CTS system 500 may save the user's voice 170 and the corrected sentence 170 to the database 150.

The user application 200' is configured to provide a training text 211 to the user to read so that the user's spoken audio is saved together with the training text 211, which corresponds to the user's spoken audio, in the database 150. The user application provides a "ready" button 213 next to the training text 211 so that the user presses the "ready" button 213 and then begins to read the training text 211 to be recorded. Furthermore, once the "ready" button 213 is pressed, the "ready" button is configured to be changed to a "completed" button 212 so that the user presses the "completed" button 212 once he finishes reading the training text 211.

In the alternative embodiment, the audio preprocessor 100 provides a speech-to-text and text-to-speech converting service to a user with a speech disorder during a phone call between the user and a peer. The audio preprocessor 100 includes a controller 160, a database 150, an audio input unit 110, a speech-to-text handler 120, a text-to-speech handler 130, and an audio output unit 140. The database 150 is associated with the user and stores user's spoken audio and corresponding text. The audio preprocessor 100 is constructed to be connected to a user's device 200 and a peer's device 400 for the phone call between the user's device 200 and the peer's device 400, and the audio input unit 100 receives a user's voice 170 from the user's device 200. The speech-to-text handler 120 is configured to transcribe the user's voice 170 into text 180 based at least in part on the database 150, and the text-to-speech handler 130 is configured to convert the text 180 into a clear and articulate speech 190 to help the peer better understand the user's voice. Then, the audio output unit 140 receives the speech 190 and sends to the peer's device 400 the speech 190 instead of the user's voice 170 to help the peer better understand what the user said. Furthermore, the audio preprocessor 100 is configured to provide a training text 211 to the user's device 200 in order for the user to read it so that the user's spoken audio is saved together with the training text 211, which corresponds to the user's spoken audio, in the database 150. The audio preprocessor 100 is configured to send to the user's device 200 the text 180, transcribed from the user's voice 170 by the speech-to-text handler 120, in order to be displayed for confirmation or correction by the user.

As shown in FIGS. 1 and 2, the audio preprocessor 100 or the speech-to-text handler 120 sends the text 180 to the user's device 200 for correction or confirmation by the user, and then, the text 180, confirmed or corrected by the user, is sent back to the audio preprocessor 100 or the speech-to-text handler 120.

In the alternative embodiment, the audio preprocessor 100 of the present invention may be provided to a user with a speech disorder without utilizing the CTS server 300. In this case, the user may not be DHH and does not require transcription of the peer's voice.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A captioned telephone service ("CTS") system for a user with a hearing impairment and a speech disorder, comprising:
   a CTS server for providing a transcription service to the user during a phone call between the user and a peer;
   a user's device, which is constructed to be connected to the CTS server for the phone call between the user's device and a peer's device;
   a user application installed on the user's device; and
   a database, which is associated with the user and stores user's spoken audio and corresponding text,
   wherein the CTS server transcribes peer's voice into a transcribed text and transmits the transcribed text to the user's device,
   wherein the CTS system comprises a speech-to-text handler and a text-to-speech handler,
   wherein the speech-to-text handler is configured to transcribe user's voice into text based at least in part on the database,
   wherein the text-to-speech handler is configured to convert the text into a speech which is then sent to the peer's device,
   wherein the speech-to-text handler uses a speech recognition system, which has database of the speech recognition system, to transcribe the user's voice into the text, and
   wherein the speech-to-text handler assigns greater weight to data of the database of the CTS system than data of the database of the speech recognition system in transcribing the user's voice into the text.

2. The CTS system of claim 1, further including an audio preprocessor, comprising:
   a controller;

9 the database;
an audio input unit;
the speech-to-text handler;
the text-to-speech handler; and
an audio output unit,
wherein the audio input unit receives the user's voice from the user's device,
wherein the audio output unit receives the speech and sends it to the peer's device.

3. The CTS system of claim 1, wherein the user application is configured to provide a training text to the user to read so that the user's spoken audio is saved together with the training text, which corresponds to the user's spoken audio, in the database.

4. The CTS system of claim 3, wherein the CTS system is configured to split the user's spoken audio into small audio segments and split the training text into corresponding small text segments, and then to save the small audio segments and the corresponding small text segments in the database.

5. The CTS system of claim 3, wherein the CTS system further includes a training text generator which generates the training text by analyzing previous calls of the user and previous incorrect transcription of the user's voice.

6. The CTS system of claim 1, wherein the user application is configured to receive a training text typed or inputted by the user in order for the user to read the training text such that the user's spoken audio is saved together with the training text, which corresponds to the user's spoken audio, in the database.

7. The CTS system of claim 1, wherein the CTS system is configured to display the text, transcribed from the user's voice by the speech-to-text handler, on the user's device for confirmation or correction by the user.

8. The CTS system of claim 7, wherein the CTS system is configured to save the user's voice together with the text, confirmed or corrected by the user, in the database.

9. The CTS system of claim 8, wherein the CTS system is configured to split the user's voice into small audio segments and split the text into corresponding small text segments, and then to save the small audio segments and the corresponding small text segments in the database.

10. The CTS system of claim 1, wherein the speech recognition system uses a language model to analyze the text, transcribed from the user's voice by the speech-to-text handler, in order to provide suggestions of a word, phrase, or sentence for correction such that the suggestions are displayed on the user's device for review by the user.

11. The CTS system of claim 1, wherein the speech recognition system uses a language model to generate the text, wherein the language model analyzes previously transcribed conversation between the user and the peer in the phone call between the user and the peer.

12. The CTS system of claim 1, wherein the database of the speech recognition system includes context information based on conversation between the user and the peer and a phone number of the peer.

13. A user's device for receiving a transcription service and a speech-to-text and text-to-speech converting service to a user with a hearing impairment and a speech disorder during a phone call between the user and a peer by using a captioned telephone service ("CTS") system, the user's device comprising:
a user application installed on the user's device, wherein the user's device is constructed to be connected to a CTS server for the phone call between the user's device and a peer's device,

wherein the CTS system comprises a database, which is associated with the user and stores user's spoken audio and corresponding text,
wherein the CTS system comprises a speech-to-text handler and a text-to-speech handler, wherein the speech-to-text handler is configured to transcribe user's voice into text based at least in part on the database, wherein the text-to-speech handler is configured to convert the text into a speech which is then sent to the peer's device,
wherein the user application is configured to provide a training text to the user to read so that the user's spoken audio is saved together with the training text, which corresponds to the user's spoken audio, in the database, and wherein the user application is configured to display the text transcribed from the user's voice by the speech-to-text handler,
wherein the user application is configured to provide a training text to the user to read so that the user's spoken audio is saved together with the training text, which corresponds to the user's spoken audio, in the database, wherein the user application provides a ready button next to the training text so that the user presses the ready button and then begins to read the training text to be recorded, and wherein once the ready button is pressed, the ready button is configured to be changed to a completed button so that the user presses the completed button once he finishes reading the training text.

14. The user's device of claim 13, wherein the user application provides an auto confirm button and a manual confirm button, wherein if the manual confirm button is activated by the user, the user application allows the text, transcribed from the user's voice by the speech-to-text handler, to be confirmed or corrected by the user, and wherein if the auto confirm button is activated by the user, the user application does not allow the text, transcribed from the user's voice by the speech-to-text handler, to be corrected by the user.

15. The user's device of claim 14, wherein the user application further provides an add button, wherein if the manual confirm button is activated by the user and the user presses the add button, the text, transcribed from the user's voice by the speech-to-text handler, and the corresponding user's voice are saved in the database or provided to a list of training text.

16. The user's device of claim 14, wherein if the manual confirm button is activated by the user, the user application provides to the user a suggestion for correction for the text, transcribed from the user's voice by the speech-to-text handler.

17. An audio preprocessor for providing a speech-to-text and text-to-speech converting service to a user with a hearing impairment and a speech disorder during a phone call between the user and a peer, the audio preprocessor comprising:
a controller;
a database, which is associated with the user and stores user's spoken audio and corresponding text;
an audio input unit;
a speech-to-text handler;
a text-to-speech handler; and
an audio output unit,
wherein the audio preprocessor is constructed to be connected to a user's device and a peer's device for the phone call between the user's device and the peer's device,
wherein the audio input unit receives a user's voice from the user's device, wherein the speech-to-text handler is configured to transcribe the user's voice into text based at least in part on the database, wherein the text-to-speech handler is configured to convert the text into a speech, wherein the audio output unit receives the speech and sends it to the peer's device, wherein the audio preprocessor is configured to provide a training text to the user's device in order for the user to read it so that the user's spoken audio is saved together with the training text, which corresponds to the user's spoken audio, in the database, wherein the speech-to-text handler uses a speech recognition system, which has database of the speech recognition system, to transcribe the user's voice into the text, and wherein the speech-to-text handler assigns greater weight to data of the database of the CTS system than data of the database of the speech recognition system in transcribing the user's voice into the text.

18. The audio preprocessor of claim 17, wherein the audio preprocessor is configured to send to the user's device the text, transcribed from the user's voice by the speech-to-text handler, in order to be displayed for confirmation or correction by the user.

19. The audio preprocessor of claim 17, wherein the user application provides a ready button next to the training text so that the user presses the ready button and then begins to read the training text to be recorded, and wherein once the ready button is pressed, the ready button is configured to be changed to a completed button so that the user presses the completed button once he finishes reading the training text.

* * * * *